United States Patent [19]

Ledon et al.

[11] Patent Number: 4,943,422

[45] Date of Patent: Jul. 24, 1990

[54] PROCESS FOR TREATMENT OF GASEOUS EFFLUENTS CONTAINING SULFUR DIOXIDE WITH OXYGEN

[75] Inventors: Henry Ledon, Lyons; Jean Louise, Villejuif; Panayotis Cocolios, Limours, all of France

[73] Assignee: L'Air Liquide, Societe Anonyme Pour L'Etude et L'Exploitation Des Procedes Georges Claude, Paris, France

[21] Appl. No.: 275,135

[22] PCT Filed: Feb. 24, 1988

[86] PCT No.: PCT/FR88/00104

§ 371 Date: Sep. 12, 1988

§ 102(e) Date: Sep. 12, 1988

[87] PCT Pub. No.: WO88/06483

PCT Pub. Date: Sep. 7, 1988

[30] Foreign Application Priority Data

Feb. 25, 1987 [FR] France ................................. 87 02491

[51] Int. Cl.$^5$ ............................................. C01B 17/00
[52] U.S. Cl. ..................................... 423/242; 423/522
[58] Field of Search ................ 423/242 R, 242 A, 522

[56] References Cited

U.S. PATENT DOCUMENTS

| | | | |
|---|---|---|---|
| 2,021,936 | 11/1935 | Johnstone | 423/242 |
| 2,926,999 | 3/1960 | Tarbutton et al. | 423/242 |
| 3,947,546 | 3/1976 | Louise et al. | 423/242 |
| 4,076,793 | 2/1978 | Nikolai | 423/242 |
| 4,100,259 | 7/1978 | Salaun et al. | 423/242 |
| 4,284,608 | 8/1981 | Pessell | 423/242 |

FOREIGN PATENT DOCUMENTS

| | | |
|---|---|---|
| 2951425 | 7/1980 | Fed. Rep. of Germany . |
| 2186285 | 1/1974 | France . |
| 604572 | 4/1978 | U.S.S.R. ............... 423/242 |

*Primary Examiner*—Gregory A. Heller
*Attorney, Agent, or Firm*—Browdy and Neimark

[57] ABSTRACT

A method and apparatus are provided for treating gaseous effluents containing sulfur dioxide. Sulfur dioxide is oxidized by oxygen in a concentrated sulfuric acid medium in the presence of a catalyst comprising electrooxidized salts of Mn+2. The gaseous effluents are converted to directly usable sulfuric acid.

6 Claims, 1 Drawing Sheet

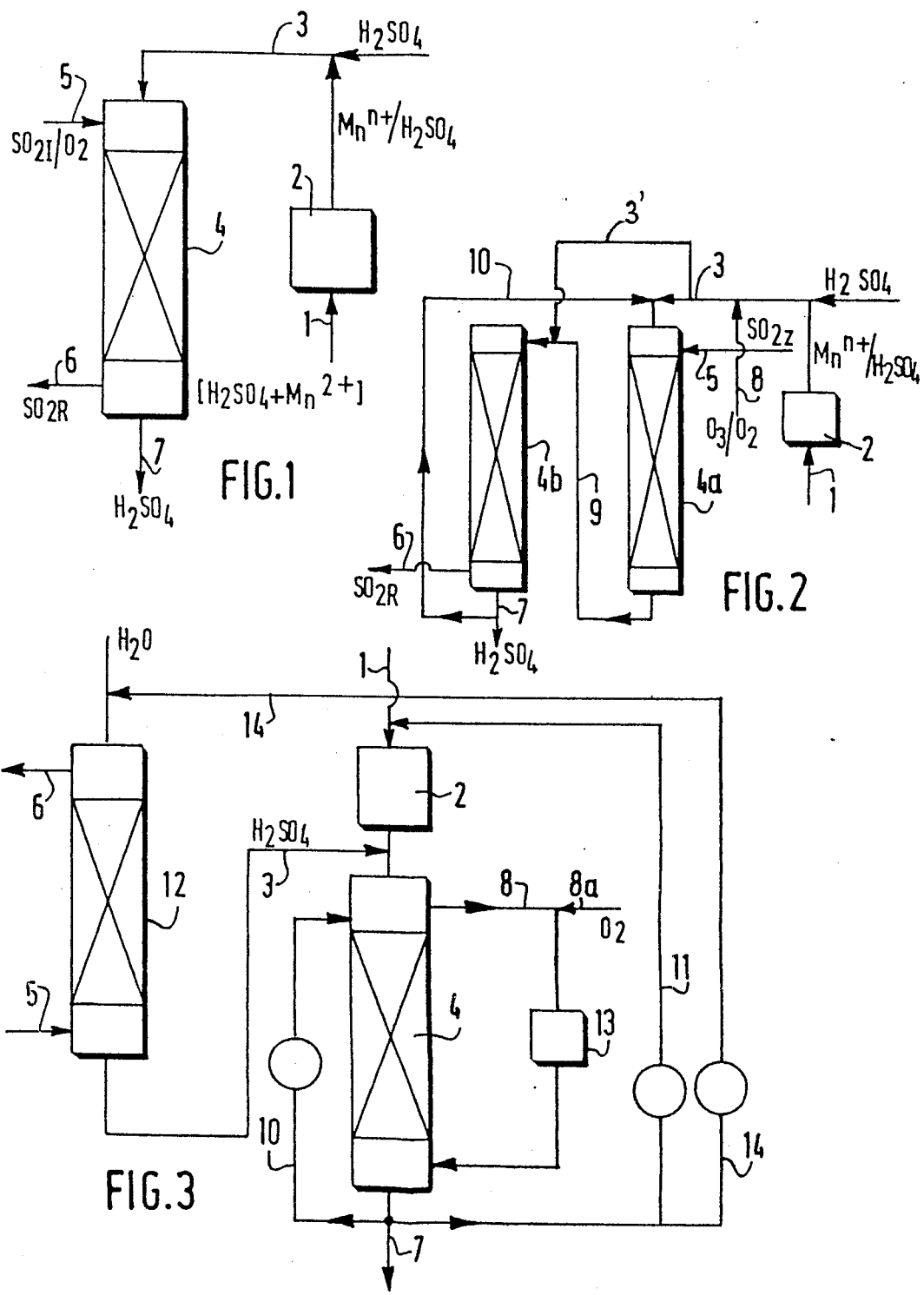

PROCESS FOR TREATMENT OF GASEOUS EFFLUENTS CONTAINING SULFUR DIOXIDE WITH OXYGEN

FIELD OF THE INVENTION

This invention has as its object a process for purification treatment of gaseous effluents containing sulfur dioxide.

BACKGROUND OF THE INVENTION

Fossils fuels a and more particular heavy cut fuels are the main cause of sulfur dioxide emissions. To this can be added the industries using or consuming sulfur or its mineral combinations, such as the industries for synthesis of sulfuric acid by combustion of sulfur, roasting of ores, calcining of certain mineral salts, metallurgy, etc. The atmospheric discharge of gaseous effluents containing sulfur dioxide constitutes a considerable pollution source and is responsible for serious damage to the environment.

Oxidation of sulfur dioxide by oxygen is slow, and numerous technologies for treatment of gaseous effluents are based on the absorption of sulfur dioxide by a solid base compound or a compound in the form of an aqueous suspension. The solid or liquid combination thus obtained is mechanically separated from the gaseous flow, then optionally treated. Under these conditions, it is still necessary to eliminate these unusable compounds in a way that it acceptable on the economical and ecological level.

A second mode of purification consists of oxidizing the sulfur dioxide by oxygen or air in an aqueous medium, which provides a more or less dilute sulfuric acid solution which can be used.

Certificate of addition FR.2.058.158 describes a process for purification of fumes comprising sulfur dioxide, consisting a first stage of a reaction with the ozone carrier by a carrying fluid such as oxygen and a second stage putting the fumes in contact with a sulfuric acid solution.

However, to achieve this oxidation with kinetics which are compatible with the contingencies of industrial operation, it is necessary to add catalysts to the oxidation medium, preferably metal salts, and particularly manganese salts.

From French patent 2,186,285 a process is known in which the gaseous effluent containing sulfur dioxide is contacted with a dilute sulfuric acid solution in the presence of manganese sulfate which has been previously oxidized by ozone.

Purification of gaseous effluents containing sulfur dioxide by oxidation catalytic reaction leading to a more or less concentrated sulfuric acid solution has been the object of numerous studies.

French patent 2,238,669 describes the oxidation of a gaseous effluent containing oxygen and sulfur dioxide by prolonged contact with a dilute sulfuric acid containing manganese sulfate.

Although this method theoretically makes possible the further use of the sulfur dioxide contained in the gaseous effluents, its practical use poses various problems. The amounts of catalysts used are great; moreover, the sulfuric acid collected is relatively dilute and contains a high level of impurities coming from the residual catalyst. Obtaining marketable sulfuric acid from such a process would require the use of one or more purification stages to eliminate the catalysts, and a concentration stage to achieve an acceptable acid strength. It is clear that these stages would greatly burden the overall economy of the process with debt.

French patent 2,323,632 discloses a process for treatment of gaseous effluents containing sulfur dioxide comprising putting said effluents in contact with an aqueous sulfuric acid solution in the presence of oxygen or air and a catalyst such as a manganese ore salt, according to which the aqueous sulfuric acid solution obtained after contact and containing sulfur dioxide is subjected to the action of a oxidation initiator of the ionizing radiation type. The sulfuric acid solution is irradiated either by a source of ionizing radiation coming from X-rays, gamma rays of radioactive isotopes as $^{60}Co$, $^{137}Ca$, and the breakage of a charge-particle accelerator. According to this process a degree of purification of gases greater than 0.95 can be attained, while obtaining a sulfuric acid in a concentration of up to 50%.

This process seems to offer only scientific laboratory interest, because its use on an industrial scale is completely inconceivable because of the various serious drawbacks. Treatment of large volumes of sulfuric acid by irradiation results in a requirement for apparatus at the purification site is vey expensive. Further, the use of X or gamma rays at an industrial site is dangerous and poses very serious safety problems for the personnel.

In connection with these observations and considering that the active species responsible for oxidation of the sulfur dioxide by oxygen is a manganese ion with a degree of oxidation greater than $+II$ : $Mn^{n+}$, an effort was made to find an economically acceptable industrial purification process, with a very high efficiency, greater than 99% and leading to obtaining a directly usable high-strength sulfuric acid solution without further treatment while using a minimal amount of catalyst.

SUMMARY OF THE INVENTION

According to the process of the present invention, the purification treatment of gaseous effluents containing sulfur dioxide by a sulfuric acid solution in the presence of oxygen and a catalytic system based on manganese salts, is characterized in that the catalytic oxidation of the sulfur dioxide by oxygen is conducted in a concentrated sulfuric medium, in the presence of a system generated by electrooxidation of manganese salts a $Mn^{2+}$.

It has been found that use of solution of manganese sulfate $MnSO_4 \cdot H_2O$ nonelectrolyzed in sulfuric acid a does not permit oxidation of the sulfur dioxide. On the other hand, oxidation of at least 15 moles of $SO_2$ per mole of electron supplied by the electrolyzer, has been observed which confirms the catalytic role of the active species produced by electrooxidation of manganese with a oxidation state greater than $+II$.

Further, the use of air instead of oxygen for oxidation of the sulfur dioxide leads to very slight purification efficiencies. If oxygen is replaced by nitrogen the conversion is zero. By oxygen is meant a gast or gas mixture containing at least 80% oxygen and preferably at least 90%.

The active species in the form of the $Mn^{n+}$ ion is generated by electrolytic oxidation of the manganese ion in a concentrated sulfuric acid medium. This electrochemical generation of the active species $Mn^{n+}$ is achieved by electrolysis of a sulfuric solution of manganese sulfate $MnSO_4 \cdot H_2O$ in an electrolyzer made up of two separate compartments. The electrodes can comprise, for example, a platinum-coated titanium grid for the anode and a platinum grid or a grid of stainless steel sheet for the cathode.

The choice of materials such as lead or titanium covered with precious metals or with lead dioxide are also of a suitable type. The potential applied between the two electrodes can vary from 1.5 to 3 volts, but it is preferably between 1.8 and 2.2 volts.

The active species is prepared continuously or batchwise, and it is transferred into the purification treatment cycle of the gaseous effluent in an amount selected and determined as a function of the sulfur dioxide of the gaseous effluent to be purified. Thus, by way of example, for a sulfur dioxide content between 400 and 10,000 parts per million (ppmV) the amount of manganese can be between 18 and 64 mg per liter of scrubbing sulfuric acid with a purification efficiency greater than 99%.

Catalytic oxidation of the effluent containing sulfur dioxide by oxygen is very advantageously used in an oxidation zone previously impregnated with the concentrated sulfuric acid medium containing the electrochemically activated catalytic system. In the opposite case, corresponding to the introduction of effluent containing $SO_2$ in the oxidation zone followed by adding to this zone the sulfuric medium containing $Mn^{n+}$, no significant oxidation was observed.

According to an advantageous option, it is possible to consider performing the catalytic oxidation of the effluent under slightly elevated oxygen pressure, preferably between 0.2 and 1 MPa.

It was found that addition of slight amounts of ozone distinctly improves the catalytic ability of the system of oxidation of effluents containing sulfur dioxide by oxygen in the presence of the electrochemically generated active catalytic species $Mn_n^{30}$. According to another embodiment, the catalytic oxidation is performed in the presence of small quantities of ozone carried in the oxygen as a carrier fluid on the order of 40 to 80 mg per hour, to provides a constant oxidation efficiency on the order of at least 99%.

In the set of conditions of a continuous process including variations, it is possible advantageously to provide at least one of the following recyclings:
recycling of the sulfuric acid medium in the oxidation zone and optionally in the zone of scrubbing the effluent to be purified; recycling of the catalyst to the electrolysis cell, by injection of sulfuric acid; even recycling of oxygen into the oxidation zone.

It is also possible to perform the catalytic oxidation continuously in one or more successive oxidation zones; optionally a with intermediate introduction of the catalytic system between the oxidation zones, or with intermediate introduction of ozone between said oxidation zones, or with intermediate introduction of the catalytic system and ozone.

BRIEF DESCRIPTION OF THE DRAWINGS

FIG. 1 shows an apparatus for purifying gases containing sulfur dioxide.

FIG. 2 shows an apparatus having two successive oxidation zones.

FIG. 3 shows an apparatus wherein the catalyst, sulfuric acid, and oxygen are recycled.

DETAILED DESCRIPTION OF THE INVENTION

The process of purification of polluted effluents and obtention of directly usable sulfuric acid can be used in various types of apparatus described by way of nonlimiting example and represented in the accompanying figures.

In the apparatus of FIG. 1, the active catalytic species is prepared in the anode compartment of electrolyzer (2), the sulfuric acid solution containing manganese sulfate being introduced into the electrolyzer by pipe (1). The electrochemically activated manganese solution is injected into the sulfuric acid circuit (3) by a metering pump (not shown). This sulfuric acid solution containing $Mn^{n+}$ is introduced into oxidation column (4) and impregnates the packing, which consists, for example, of glass rings, or plates. Then, the gaseous effluent containing sulfur dioxide (5) in a pure oxygen current, cocurrent with the sulfuric acid solution containing $Mn^{n+}$, is introduced into the oxidizer. The purified effluent is collected at (6) in the lower part of the oxidizer and commercially usable sulfuric acid is collected at (7) at the base of the oxidizer.

Use of the purification process in two successive oxidation zones, in the presence of ozone, with optional recycling of sulfuric acid, can be performed in an apparatus represented in FIG. 2.

As above, the apparatus comprises an electrolyzer (2) supplied with a solution of $H_2SO_4 + MnSO_4$ by pipe (1), the $Mn^{n+}/H_2SO_4$ solution generated in the electrolyzer is introduced by a metering pump, not shown, into sulfuric acid pipe (3), to first oxidation column (4a). The ozone-oxygen $O_3/O_2$ gas current is introduced by pipe (8) into pipe (3) carrying $Mn^{n+}/H_2SO_4$. The effluent to be treated $(SO)_I$ is introduced at the upper part of column (4a), the liquid medium removed at the base of this column is carried by circuit (8) to the upper part of second oxidation column (4b). The effluent itself is evacuated at the lower part of column (4b) and the usable sulfuric acid is removed at the base of said column by pipe (7) from which is taken a part of the concentrated sulfuric acid recyled by pipe (10) to the first oxidation column. Optionally, an intermediate introduction of the catalytic system and ozone can be performed at the head of column (4b) by pipe (3').

In embodiment of using the process with oxidation with oxygen and recycling of the catalyst, sulfuric acid and oxygen, this treatment process can be used in an apparatus represented in FIG. 3.

This apparatus comprises a scrubber (12), an electrolyzer (2), an oxidation column (4), and circuits for intake and output of different fluids. The apparatus further comprises an oxygen circuit (8) corresponding to a simple loop optionally with recompression (13) when the process is performed under pressure and addition of oxygen (8a); a sulfuric acid circuit corresponding to a simple loop (10); a circuit (11) for recycling the catalyst to electrolyzer (2); and a circuit for recycling of sulfuric acid (14) to the scrubber head; the gas to be purified being introduced at the base of scrubber (5), and the purified gas is recovered at upper part (6).

The process described has its application in the purification of effluents polluted with sulfur dioxide, with recovery of $SO_2$ in the form of directly usable sulfuric acid and obtaining of the effluents themselves.

In case of treatment of permanent effluents by pyrolysis of mineral sulfates to obtain the corresponding oxides, the sulfuric acid collected by the process can advantageously be recycled in the stage of preparation of said sulfates.

Nonlimiting examples of the process of the invention are given below.

EXAMPLE 1

Preparation of the catalyst

Oxidation of manganese sulfate $MNSO_4 \cdot H_2O$ is performed by batch in an electrolyzer with a parallel anode and cathode compartment separated by an ion-exchange memberane; passage of the current is assured by a stabilized supply.

The useful volume of each of the compartments is identical and is 80 ml. The anode consists of a platinum-plated titanium Pt/Ti grid, and the cathode consists of a platinum grid. A potential of $2.0^{+0.2}$ volts is applied between the electrodes. A nitrogen current acts as a turbulence promoter.

The solution of sulfuric acid with a concentration of 36.5% by weight contains 0.1 mole (16.9 g/l) of $MnSO_4 \cdot H_2O$; a volume of solution of 60 ml is electrolyzed during a period of 30 minutes. The evolution of the coloring of the solution, colorless at the start, to cherry red at the end of electrolysis, and the obtention of a stable current at the end of 30 minutes serve as indicators of the end of the reaction.

EXAMPLE 2

Tests were made in the apparatus represented in FIG. 1.

In a first series of continuous oxidation tests, a study was made of the amount of electrochemically activated manganese necessary to oxidize, in the presence of 99.5% pure oxygen, effluents containing increasing levels of sulfur dioxide with an efficiency greater than 99.5%.

With a total gas flow of 11 l/h and a contact time of 7 seconds, less than 25 mg/l of manganese is necessary to oxidize amounts of $SO_2$ going up to 1000 ppmV. The sulfuric acid collected has a strength of 45% by weight. The results obtained are given in table I. The concentration of $SO_2$ at the output of the oxidizer were determined continuously by conductimetry.

The purification efficiency is defined according to the ratio:

$$Rdt = \frac{(SO_2)_I - (SO_2)_R}{(SO_2)_I} \times 100$$

in which $(SO_2)_I$ is concentration of $SO_2$ at the intake of the oxidizer and $(SO_2)_2$ is the residual concentration of $SO_2$ at the output of the oxidizer, corrected by solubility of $SO_2$ in the sulfuric acid.

(Mn) designates the total concentration of manganese (independently of the degree of oxidation of the species present in solution) in the sulfuric solution.

TABLE I

| (Mn) $\times 10^3$ M | mg/l | $(SO_2)_I$ ppmV | mg/l × h | Rdt % |
|---|---|---|---|---|
| 0.337 (X) | 18.5 | 400 | 73.5 | 0 |
| 0.337 | 18.5 | 400 | 73.5 | 99.8 |
| 0.346 | 19 | 800 | 147 | 99.5 |
| 0.801 | 44 | 1200 | 220 | 99.7 |
| 0.983 | 54 | 1600 | 294 | 99.9 |
| 1.656 | 91 | 2000 | 367 | 99.5 |

(X) Without electrochemical activation of manganese sulfate.

During a second series of continuous oxidation tests, with pure oxygen and a total gas flow of 5 l/h and a contact time of 30 seconds, it was found that 32 mg/l of manganese suffices to oxidize 2000 ppmV of $SO_2$ to 97%. By doubling the amount of manganese, it was possible to oxidize 4000 ppmV of $SO_2$ with the same conversion rate. In the latter case, the purification level drops below 95% for concentrations of $SO_2$ greater than 4000 ppmV.

In this series of tests, the sulfuric acid collected has a strength of 50% by weight.

TABLE II

| (Mn) $\times 10^3$ M (mg/l) | $(SO_2)_I$ ppmV | $\times 10^3$ M (mg/l × h) | $(SO_2)_{OX}$ $\times 10^3$ M | Rdt % | NRh$^{-1}$ |
|---|---|---|---|---|---|
| 0.582 (32) | 2000 | 2.59 (166) | 2.52 | 97 | 4.3 |
| 0.582 (32) | 3000 | 3.89 (249) | 3.70 | 95.3 | 6.4 |
| 0.582 (32) | 4000 | 5.20 (333) | 3.54 | 68 | 6.1 |
| 0.582 (32) | 5000 | 6.50 (416) | 3.84 | 59 | 6.6 |
| 1.165 (64) | 2000 | 2.59 (166) | 2.58 | 99.8 | 2.2 |
| 1.165 (64) | 3000 | 3.89 (249) | 3.88 | 99.7 | 3.3 |
| 1.165 (64) | 4000 | 5.20 (333) | 5.04 | 97 | 4.3 |
| 1.165 (64) | 5000 | 6.50 (416) | 4.88 | 75 | 4.2 |

$(SO_2)_{OX}$ designates the concentration of $SO_2 = (SO_2)_I - (SO_2)_R$
NR$^{-1}$ Number of hourly notations
NR = Number of moles of oxidized $SO_2$ Number of moles of manganese The results of these tests show that the $SO_2$ contained in the effluents is oxidized by pure oxygen in a concentrated sulfuric acid medium in the presence of electrochemically prepared $Mn^{n+}$. Further, the values of the number of hourly notations shows the catalytic effect of the manganese on the reaction. For nonoptimized conditions of the oxidizer, the value of 6.6 moles of $SO_2$ oxidized per mole of manganese introduced. The rates of conversion obtained depend on the gas/liquid contact time; the variations found in the two series of tests clearly show this effect.

EXAMPLE 3

Synergistic effect with ozone.

Continuous tests were run in the apparatus represented in FIG. 2, supplied with pure oxygen.

The ozone source has the following characteristics: UV lamps 2.5 W, 1 mg/l $O_3$ per lamp for 10 l/h oxygen.

The total gas flow is 25 liters per hour and the contact time is 19 seconds.

The results of the first series of tests are given in table III.

TABLE III

| (Mn) $\times 10^3$ M (mg/l) | $QO_3$ mg/h | $(SO_2)_I$ ppmV | $\times 10^3$ M (mg/l) × h | $(SO_2)_{OX}$ $\times 10^3$ M | Rdt % | NRh$^{-1}$ |
|---|---|---|---|---|---|---|
| 0.582 (32) | — | 5000 | 6.5 (416) | 3.84 | 59 | 6.6 |
| 1.165 (64) | — | 5000 | 6.5 (416) | 4.88 | 75 | 4.2 |
| 0.310 (17) | 80* | 10000 | 13 (832) | 12.06 | 92.8 | 39.0 |

TABLE III-continued

| (Mn) $\times 10^3$M (mg/l) | $QO_3$ mg/h | $(SO_2)_I$ ppmV | $(SO_2)_I$ $\times 10^3$M (mg/l) $\times$ h | $(SO_2)_{OX}$ $\times 10^3$M | Rdt % | $NRh^{-1}$ |
|---|---|---|---|---|---|---|
| 0.620 (34) | 80* | 10000 | 13 (832) | 12.87 | 99 | 20.8 |

*1.66 $\times 10^{-3}$ mole.

By way of comparison, this table also shows two significant test results taken from preceding table II, performed in the absence of ozone.

It was found that if, in the best case, with 0.582 mmole of manganese 3.84 mmole of $SO_2$ is oxidized in the absence of ozone, or an efficiency of 59%, with 0.620 mmole of manganese, 12.87 mmoles of $SO_2$ is transformed or an efficiency of 99%, a transformation of 12.87 mmoles of $SO_2$ or an efficiency of 99% is achieved by introducing 1.66 mmole/h (80 mg) of ozone into the oxidizer. These results show the catalytic effect of ozone on oxidation of $SO_2$ by oxygen, in the presence of electrochemically activated $Mn^{2+}$; and the synergy between ozone and $Mn^{n+}$.

In a second series of tests, the collected sulfuric acid, containing only 0.620 mmole/1 of Mn, was recycled several times and oxidation was continued always with the same amount of $SO_2$ (13 mmoles/1$\times$h) and variable amounts of ozone.

The total flow of gas is always 25 liters per hour and the contact time is about 19 seconds.

The results obtained are given in table IV.

TABLE IV

| $QO_3$ $\times 10^3$M(mg/h) | $(SO_2)_I$ ppmV | $(SO_2)_I$ $\times 10^3$M(mg/l $\times$ h) | $(SO_2)_{OX}$ $\times 10^3$M | Rdt % |
|---|---|---|---|---|
| 1.67 (80) | 10000 | 13 (832) | 12.87 | 99 |
| 1.25 (60) | 10000 | 13 (832) | 12.87 | 99 |
| 0.83 (40) | 10000 | 13 (832) | 12.81 | 98.5 |
| 0.42 (20) | 10000 | 13 (832) | * | * |

*The rate of purification decreases continuously below 40 mg/hour of ozone. With constant efficiency, the favorable amount of ozone in the oxygen is between 40 and 80 mg/hour. Reading of the results shows that the rates of purification are stable for long periods and reach 99%.

We claim:

1. A process for treatment of gaseous effluents containing sulfur dioxide to provide improved purification efficiency comprising:
   providing an oxidation zone impregnated with concentrated sulfuric acid containing a catalyst generated by electro-oxidation of manganese salts having a valence of +2;
   selecting the amount of sulfur dioxide and manganese as a function of the sulfur dioxide content of the gaseous effluents to be treated; and
   contacting said gaseous effluents with a sulfuric acid solution in the presence of oxygen containng a small amount of ozone and a catalytic base of manganese salts.

2. Process for treatment of gaseous effluents containing sulfur dioxide according to claim 10, wherein the catalytic oxidation of the gaseous effluent is performed under elevated oxygen pressure.

3. Process for treatment of gaseous effluents containing sulfur dioxide according to claim 1, wherein the treatment process is used with at least one recyling of the group consisting of recycling of the sulfuric acid medium, catalyst and oxygen.

4. Process for treatment of gaseous effluents containing sulfur dioxide according to claim 1, wherein the catalytic oxidation of the gaseous effluent is performed continuously in at least one successive oxidation zones.

5. Process for treatment of gaseous effluents containing sulfur dioxide according to claim 1, wherein the catalytic oxidation of the gaseous effluent is performed continuously in a plurality of oxidation zones with intermediated introduction of the catalytic system between the oxidation zones.

6. Process for treatment of gaseous effluents containing sulfur dioxide according to claim 1 characterized by an intermediate introduction of ozone.

* * * * *